United States Patent [19]
Cheiky

[11] Patent Number: 5,716,726
[45] Date of Patent: Feb. 10, 1998

[54] ELECTROLYTE STARVED METAL-AIR BATTERY

[75] Inventor: Michael C. Cheiky, Santa Barbara, Calif.

[73] Assignee: Dreisbach Electromotive, Inc., Kirtland, Ohio

[21] Appl. No.: 361,778

[22] Filed: Dec. 22, 1994

[51] Int. Cl.$^6$ .................. H01M 2/38; H01M 12/02
[52] U.S. Cl. .................. 429/25; 429/27; 429/81; 429/144
[58] Field of Search .................. 429/14, 25, 27, 429/81, 142, 144

[56] References Cited

U.S. PATENT DOCUMENTS

| | | | |
|---|---|---|---|
| 2,360,658 | 10/1944 | Doughty | 429/144 |
| 2,997,518 | 6/1961 | Klopp et al. | 136/90 |
| 3,138,489 | 6/1964 | Schoeffe et al. | 429/27 |
| 4,246,324 | 1/1981 | De Nora et al. | 429/27 X |
| 4,378,414 | 3/1983 | Furukawa et al. | 429/144 |
| 4,562,123 | 12/1985 | Shimizu et al. | 429/27 |
| 4,957,826 | 9/1990 | Cheiky | 429/27 |
| 4,994,332 | 2/1991 | Coin et al. | 429/14 X |
| 5,011,747 | 4/1991 | Strong et al. | 429/27 |
| 5,147,736 | 9/1992 | Lapp | 429/14 |
| 5,240,785 | 8/1993 | Okamura et al. | 429/27 |
| 5,439,758 | 8/1995 | Stone et al. | 429/27 X |

FOREIGN PATENT DOCUMENTS

| | | | |
|---|---|---|---|
| 2600495 | 1/1976 | Germany . | |
| 6-104018 | 4/1994 | Japan | H01M 12/08 |

*Primary Examiner*—Stephen Kalafut
*Attorney, Agent, or Firm*—Renner, Otto, Boisselle & Sklar

[57] ABSTRACT

A rechargeable electric battery includes a number of metal-air cells, each including a metal anode, an air cathode, an anode electrolyte absorber adjacent the anode, a cathode electrolyte absorber adjacent the cathode, a separator separating the electrolyte absorbers, an input for supplying electrolyte to the absorbers at a supply side of the cell and a drain for draining excess electrolyte from the electrolyte absorbers at a drain side of the cells, each of the metal-air cells being inclined so that the drain side is lower than the supply side.

27 Claims, 1 Drawing Sheet

ELECTROLYTE STARVED METAL-AIR BATTERY

FIELD OF INVENTION

This invention relates generally to conversion of chemical to electrical energy, particularly to rechargeable electrolyte starved metal-air batteries, and more particularly to rechargeable electrolyte starved zinc-air cells suitable for use in traction batteries for electric vehicles.

BACKGROUND OF THE INVENTION

Metal-air batteries, such as zinc-air batteries, offer the advantage of very high energy densities (up to 300 WH/kg) over many known conventional batteries, like lead-acid batteries, used to power electric vehicles. This is possible because, unlike a typical conventional battery cell that is comprised of two metal electrodes, a metal-air battery cell may have one metal electrode and a light-weight air cathode that absorbs air. For example, in a zinc-air cell, oxygen in the air is converted to hydroxyl ions and these ions react with the zinc anode to produce electricity. The high energy density of metal-air batteries, like zinc-air batteries, translates into a long operating range for electric vehicles, which in combination with low commercial production costs and a high degree of safety for both the environment and the consumer, offer significant advantages over conventional batteries for use in large consumer applications, like electric vehicles. To generate sufficient electricity to power a motor for such a large application, hundreds of individual metal-air cells may be electrically connected within the metal-air battery.

These batteries typically use a water-based electrolyte to convert oxygen to hydroxyl ions, which react with the zinc anode to produce electricity. However, excess electrolyte within a cell may interfere with hydrogen gas transport from the cell during a discharge cycle and may encourage the formation of conductive paths through the cell which contribute to dendrite growth and the possibility of an electrical short within the cell. Excess electrolyte within the cell may also increase the hydrostatic pressure on the cathode, thus leading to premature penetration of moisture into the cathode, either through defects in the cell or the eventual wetting out of the hydrophobic surfaces. Further, because the air cathode of a metal-air cell passes water molecules as easily as oxygen molecules (due to similar molecular size and polarization), water loss is experienced from the electrolyte if the ambient humidity is less that the equilibrium relative humidity value for the metal-air cell. This drying out of the cell can cause failure. Additionally, heat produced by the electrolytic reaction increases water loss from the cell.

There are other problems associated with the electrolyte that may interfere with cell performance. Carbonation of the electrolyte, due to a reaction of carbon dioxide with certain cell components and the electrolyte, interferes with the electrochemical reaction. While a carbon dioxide scrubber can be used to filter out some of this carbonation, the scrubber may become saturated. In a zinc-air battery cell, uneven distribution of the electrolyte near the zinc anode, resulting in local concentration gradients of electrolyte, contributes to dendrites of zinc growing from the zinc anode to the air cathode during cycling of the cell. Eventually, dendrite formation may cause the cell to short out. Additionally, leakage of excess electrolyte can cause cell failure and corrosion of cell surroundings.

It would be desirable to provide a metal-air cell which enabled the uniform distribution of electrolyte throughout the cell and which enabled adequate control of the electrolyte to avoid many of the problems associated with excess or inadequate amounts of electrolyte within the cell.

SUMMARY OF THE INVENTION

The present invention provides an electrolyte starved zinc-air battery which produces a large amount of electrical energy for its weight, is relatively inexpensive, and is capable of numerous recharge/discharge cycles. The battery includes a number of zinc-air cells which are disposed at a slight angle to horizontal in the battery. The components of the cell are preferably provided with as little electrolyte as is needed for battery operation with excess electrolyte being drained at the lower portion of the cells. As a result, the overall life and number of discharge/recharge cycles of the battery is increased over other conventional metal-air batteries.

In accordance with one aspect of the invention, a rechargeable electric battery includes a number of metal-air cells, each including a metal anode, an air cathode, an anode electrolyte absorber adjacent the anode, a cathode electrolyte absorber adjacent the anode, a separator separating the electrolyte absorbers, an input for supplying electrolyte to the absorbers at a supply side of the cell and a drain for draining excess electrolyte from the electrolyte absorbers at a drain side of the cells, each of the metal-air cells being inclined so that the drain side is lower than the supply side.

In accordance with another aspect of the invention, a rechargeable electrolyte starved zinc-air cell includes a zinc anode, an air cathode, an anode electrolyte absorber adjacent the anode, a cathode electrolyte absorber adjacent the cathode, a separator separating the electrolyte absorbers, an input for supplying electrolyte to the absorbers at a supply side of the cell and a drain for draining excess electrolyte from the electrolyte absorbers at a drain side of the cell, the supply side of the cell being elevated relative to the drain side.

In accordance with a further aspect of the invention, a rechargeable zinc-air electric traction battery for a vehicle includes a plurality of electrolyte starved zinc-air cells, each including a zinc anode, an air cathode, an anode electrolyte absorber adjacent the anode, a cathode electrolyte absorber adjacent the cathode, a separator separating the electrolyte absorbers, an input for supplying electrolyte to the absorbers at a supply side of the cell and a drain for draining excess electrolyte from the electrolyte absorbers at a drain side of the cells, each of the zinc-air cells being inclined so that the drain side is lower than the supply side, and an electrolyte pump for pumping electrolyte from the drain side of the cells to the supply side of the cells.

In accordance with a still further aspect of the invention, a rechargeable zinc-air battery for use in large consumer applications, like electric vehicles, includes a plurality of electrolyte starved zinc-air cells, each stacked one on top of the other at an incline so that one side of the cells is elevated in relation to the other side of the cells.

The foregoing and other features of the invention are hereinafter fully described and particularly pointed out in the claims, the following description and the annexed drawings setting forth in detail certain illustrative embodiments of the invention, these being indicative, however, of but a few of the various ways in which the principles of the invention may be employed. It will be appreciated that the scope of the invention is to be determined by the claims and the equivalents thereof.

DETAILED DESCRIPTION OF THE INVENTION

Figure 1:
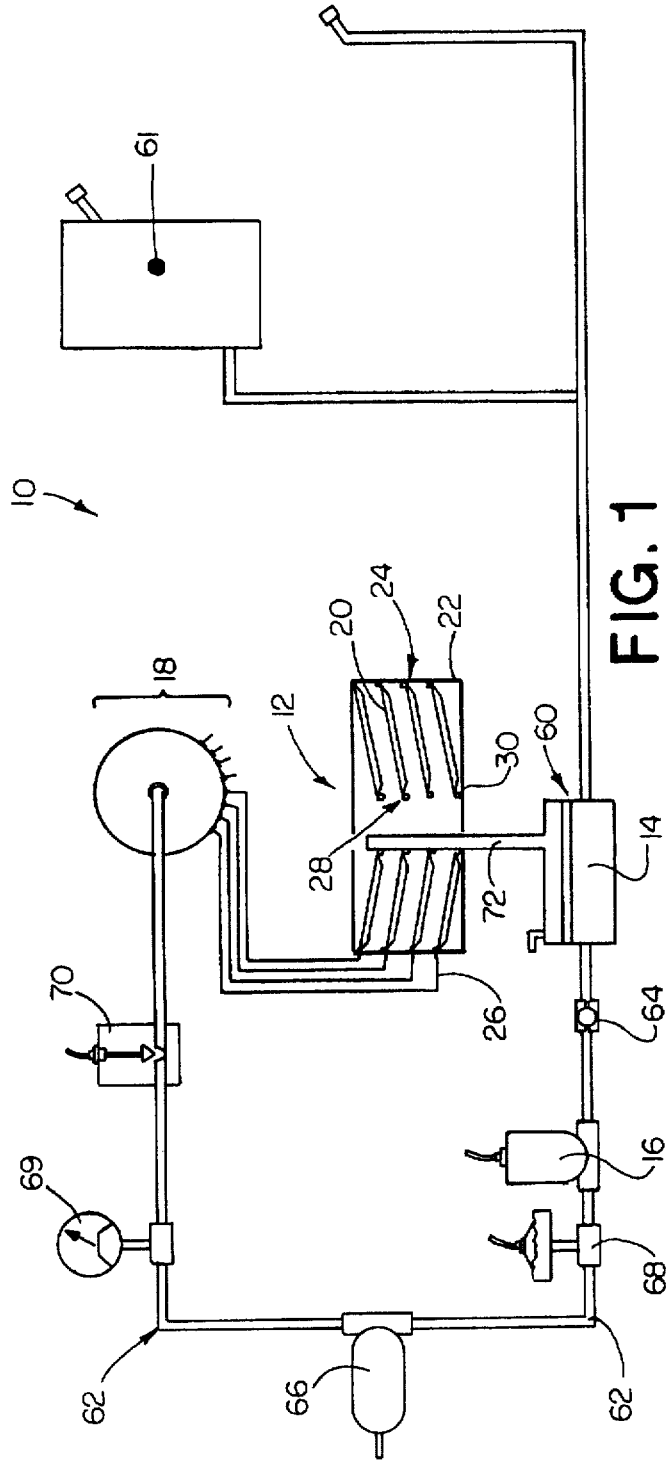
FIG. 1 is a schematic view of a battery system including an electrolyte starved zinc-air battery and an electrolyte dispensing system in accordance with a preferred embodiment of the invention.

Referring to FIG. 1 of the drawings, a rechargeable, electrolyte starved metal-air battery system embodying the present invention is generally designated by the reference numeral 10. The battery system 10 generally includes a metal-air battery 12, an electrolyte collecting tank 14, a pump 16, an electrolyte dispensing system 18 and a number of related elements described below. The metal-air battery 12 includes a number of rechargeable, electrolyte starved zinc-air cells 20 contained within a battery housing 22. Preferably, the zinc-air cells 20 are stacked generally vertically, with each cell inclined to allow for electrolyte and gas flow. In the preferred embodiment, the cells 20 are inclined at approximately 6° to 10° to horizontal, with higher angles allowing higher charging rates but occupying more volume. At the elevated end 24 of each cell 20 is an electrolyte injection port 26 through which electrolyte is provided to the cell from the electrolyte dispensing system 18. At the lower end 28 of each cell 20 is a drain 30 for draining excess electrolyte from each cell 20. The excess electrolyte drained from each cell via the drain 30 is collected, recycled and returned to the zinc-air cells 20 through the electrolyte collecting tank 14, the pump 16 and the electrolyte dispensing system 18.

Figure 2:
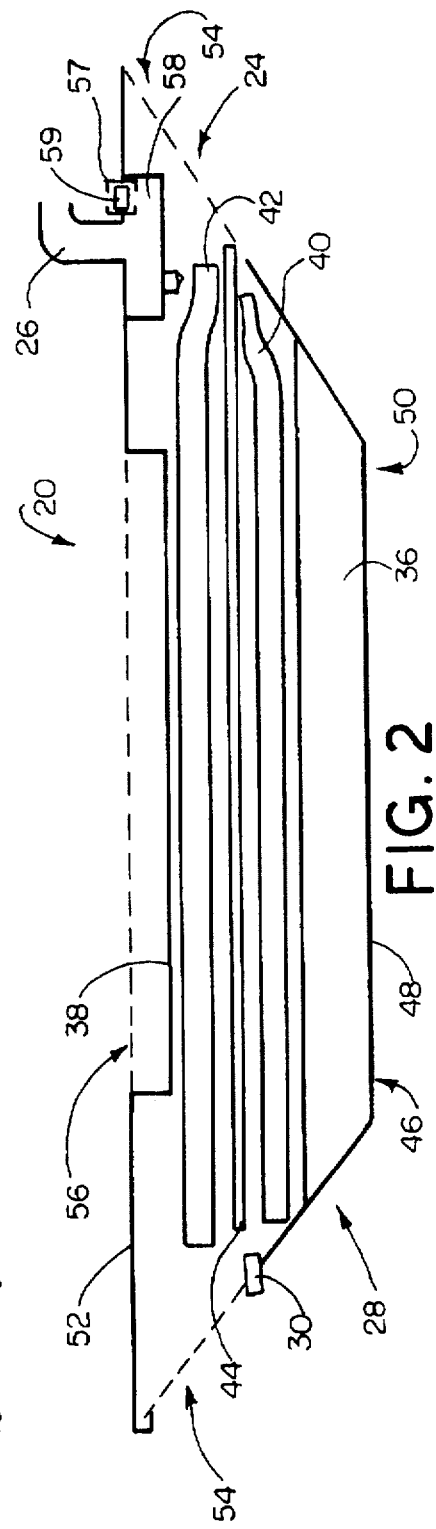
FIG. 2 is a cross-sectional view of an electrolyte starved zinc-air cell, shown in FIG. 1.

Referring now to FIG. 2, a rechargeable, electrolyte starved zinc-air cell 20 is shown in cross-section. The cell 20 includes a zinc anode 36, an air cathode 38, two electrolyte absorbers 40 and 42 and a separator 44 housed in a container 46. The container 46 includes a lower, electrically conductive base 48, with bottom 50 and sides 54 and a top 52. The lower base 48 may be constructed of an electrically conductive metal which is resistant to corrosion from battery action and electrolyte. Alternatively, the base 48 may be constructed from an electrically non-conductive material, such as polyvinylchloride (PVC), polystyrene or polypropylene, to which an electrically conductive, chemically resistant metal plate or screen has been bonded. The top 52 is preferably made out of a non-conductive, structural plastic material such as polyvinylchloride (PVC), polystyrene, or polypropylene. The base 48 and the top 52 are sealed together by any one of a number of conventional sealing processes. This sealing prevents leakage of electrolyte from the cell 20 to the interior of the battery housing 22.

The zinc anode 36 is situated in the bottom of the electrically conductive base 48 and is electrically coupled to the base 48. The zinc anode 36 is preferably made of zinc paste, although other forms of zinc, like zinc foil, may be used. In the preferable paste form, various corrosion inhibitors and paste forming additives may be alloyed or physically mixed with zinc particles to form the zinc paste, and the paste is then preferably packed into an electrically conductive mesh screen to form the zinc anode 36. The mesh screen can be formed of expanded metal or foamed metal, with a mesh size of, for example, 20 to 80 openings per inch, and of a non-corroding metal, like nickel, silver, tin or titanium, or plating of a non-corroding metal. A conductive lead (not shown) extends outwardly from the metal base 48 to provide an electrically positive terminal connection for the cell 20.

The air cathode 38 of the electrolyte starved cell 20 is situated immediately below the top 52 of the cell container 46 and electrically insulated from the metal base 48. The air cathode 38 is preferably in the form of an air permeable woven or non-woven carbon membrane or similar material with a high affinity for oxygen. The top 52 includes openings or vents 56 adjacent the air cathode 38 to permit air to flow across and to contact the surface of the air cathode. A layer of catalyst, such as a noble metal like platinum or palladium, is preferably applied to the lower surface of the air cathode membrane, although it can be applied to upper surface. The air cathode 38 has a conductive lead (not shown) attached to it, extending outwardly therefrom to a negative terminal of the battery.

Adjacent the zinc anode 36 and the air cathode 38 are the electrolyte absorbers 40 and 42. The electrolyte absorber 40 is located immediately above the anode 36 and is in contact with the anode. The electrolyte absorber 42 is located immediately below the air cathode 38 and is in contact with the air cathode. The electrolyte absorbers 40 and 42 are made of a material having significant capillary or wicking action so that electrolyte is absorbed throughout substantially the entire length of each absorber, thereby uniformly supplying electrolyte over substantial portions of the anode 36 and cathode 38. Because differences in local concentration of electrolyte near the zinc anode 36 contribute to dendrite formation, uniform distribution of electrolyte adjacent the zinc anode 36 reduces dendrite formation, resulting in longer cycle life of the cell 20.

Preferable materials for the electrolyte absorbers 40 and 42 are cellulose-type fibers, such as carboxyl methyl cellulose (CMC), cotton or rayon. The material can be either in a mat form or hydrogel, where particles of the material are suspended in water and the mixture is the consistency of pudding or gelatin. Alternatively, an inert plastic with a hydrophilic coating can be used although the coating may degrade over time. The electrolyte absorbers 40 and 24 are supplied with electrolyte from an electrolyte reservoir 58 located near the elevated end 24 of the cell. Positioned between and separating the electrolyte absorbers 40 and 42 is the separator 44. The separator 44 allows passage of the hydroxyl ions from the air cathode 38 to the anode 36, but rejects the flow of zinc ions toward the air cathode 38 from the anode 36. The separator 44 is preferably made of cellophane or a modified cellophane material. The separator 44 terminates above the outlet of the electrolyte reservoir 58 and above the elevated ends of the electrolyte absorbers 40 and 42 to prevent the formation of a conductive path between the absorbers and the resultant dendrite formation.

A hydrogen port 57 and a hydrogen port plug 59 are provided in the top of the reservoir 58. The plug 59 allows hydrogen to vent from the cell 20, such as during a charging cycle, while preventing electrolyte from splashing or otherwise leaking from the cell. The plug 59 is preferably made of a chemically inert, porous, hydrophobic material, such as an open-cell polyolefin foam.

As noted above, an electrolyte injector port 26 is located near the top, elevated end 24 of each electrolyte starved zinc-air cell 20, as stacked at a generally 10° angle to horizontal within the electrolyte starved battery 12. Located at the lower end 28 of each cell 20 is the electrolyte drain 30 which removes excess electrolyte from each cell. Electrolyte supplied from the electrolyte dispensing system 18 to the electrolyte injector port 26 is slowly dispersed to the electrolyte absorbers 40 and 42 via the electrolyte reservoir 58. The electrolyte may be a simple or mixed aqueous base such as a Group I metal hydroxide, such as LiOH, NaOH, KOH, or CsOH, in the range of one molar to saturation, usually about one to fifteen molars. Preferably, the electrolyte used is potassium hydroxide (KOH).

A suitable electrolyte dispensing system for use with the present invention is disclosed in co-pending U.S. patent application Ser. No. 08/361,770 filed on Dec. 22, 1994, entitled "Electrolyte Dispensing System and Method", and naming Michael C. Cheiky as inventor, the disclosure of which is incorporated herein by this reference. The dispensing system disclosed therein includes a dispensing unit, atop a stationary manifold that has outputs located along its perimeter, that is rotated as controlled by a microprocessor. The dispensing unit channels the filtered and rehydrated electrolyte through a conduit that sequentially aligns with passageways located in the stationary manifold. Each passageway is connected to an output on the perimeter of the stationary manifold and a feeding line is attached from each output to each individual battery cell. This automatic "watering" of cells with the appropriate amount of electrolyte results in less opportunity for electrolyte leakage, a lighter battery, and a thinner cell, producing higher energy density, longer cycle life, and flexible battery packaging.

As a very general description of the electrochemical processes occurring in a zinc-air cell 20 for the generation of electrical energy during a discharge cycle of the cell, oxygen from the environment is used to oxidize zinc in the zinc anode thereby releasing electrons. Air flowing over the air cathode 38 is absorbed into the porous carbon air cathode. The oxygen thus passes over the potassium hydroxide electrolyte to form hydroxyl ions. These ions react with the zinc of the zinc anode 36 to form zinc oxide and generate electrical current across the anode and cathode. Conversely, during a charging cycle of the battery 12, an electric charging current is impressed across the air cathode 38 and the zinc anode 36 and the zinc oxide is converted back to zinc thereby releasing oxygen gas which rises upwardly through the cell 20, through the air cathode 38 and out of the cell, thus replenishing the zinc for reaction with oxygen in a further discharge cycle. The cells 20 dissipate hydrogen gas produced on recharge by providing effective venting of the gas via the hydrogen ports 57 and the battery cells being stacked on a slight incline to horizontal within the battery casing. Because gas evolution tends to separate the cell components and disrupt electrical conductivity, effective venting of hydrogen gas tends to result in longer cycle life.

Referring back to FIG. 1, during operation of the electrolyte starved zinc-air battery 12, the excess electrolyte is drained from each cell 20 via the drain 30 and is collected in the collecting tank 14 through drain line 72. The drained excess electrolyte is thicker than the electrolyte supplied to the cells due to carbonation of the electrolyte and water loss from the electrolyte. Preferably, carbonation is filtered out of the excess electrolyte by passing the electrolyte immediately upon drainage through a carbonation filter 60 attached horizontally across the collecting tank 14. Subsequently, the filtered electrolyte is rehydrated by, preferably, adding diluted electrolyte from the storage tank 61 to the collecting tank 14, although pure water can be used. Diluted electrolyte is preferable to pure water because its freezing point is below 0° F. compared to a freezing point of 32° F. for water. The electrolyte is then pumped to the electrolyte dispensing system 18 by the pump 16 over the return line 62. A one-way valve 64 is attached to the return line 62, between the pump 16 and the collecting tank 14, to prevent electrolyte from backing up into the collecting tank 14. The electrolyte dispensing system 18 then automatically and periodically supplies electrolyte to each electrolyte injector port 26 of each cell 20.

Preferably, in addition to a pump 16, an accumulator tank 66 is also attached to the return line 62, between the pump 16 and the dispensing system 18. In this preferred embodiment, the pump 16 pumps the electrolyte to the accumulator tank 66, which holds the electrolyte until a certain pressure is detected by the pressure sensor 69, for example 30 psi. When electrolyte in the accumulator tank 66 reaches this pressure, a pressure switch 68 is triggered shutting off the pump 16. The flow of electrolyte stored in the accumulator tank 66 to the dispensing system 18 is controlled by a solenoid valve 70 which is operated in accordance with the electrolyte requirements of the dispensing system. Once the pressure of the electrolyte supplied by the accumulator tank 66 decreases to a certain pressure, for example 15 psi, the pressure switch 68 is again triggered, which activates the pump 16. The cycle is continually repeated. Supplying electrolyte under pressure counters the effect of hydraulic head, which affects the uniformity of the amount of electrolyte flowing to each cell such that, the farther the vertical distance between the electrolyte dispensing system 18 and the cell 20 being fed, the greater the amount of electrolyte dispensed, all other factors, like number or length of feedings, being equal.

The electrolyte supplied to each cell 20 via the electrolyte injector port 26 is slowly dispersed within the cell to the electrolyte absorbers 40 and 42 by the electrolyte reservoir 58. Due to the inclination of the cells 20, at about a 10° angle to horizontal, and the hydrophilic nature of the electrolyte absorbers 40 and 42, the electrolyte is absorbed across substantially the entire length of each electrolyte absorber from the elevated side 24 of the cells 20, to the lower side 28 of the cells. Any excess electrolyte not absorbed by the electrolyte absorbers 40 and 42, collectively drains from the cells 20 at the drain 30 into the collecting tank 14 through the drain line 72. The slight incline also prevents percolation and venting of the electrolyte up through the input on the elevated side of each cell. The recycling phase of the excess electrolyte is then begun again.

While a preferred example of the invention has been shown and described, numerous variations and alternate examples will occur to those skilled in the art, without departing from the spirit and scope of the present invention. Accordingly, it is intended that within the scope of the appended claims, the present invention may be practiced otherwise than as specifically described herein. It is to be realized that only a preferred example of the invention has been described and that numerous substitutions, modifications and alterations are permissible without departing from the spirit and scope of the invention as defined in the following claims. Thus, the scope of the invention should be determined by the appended claims and their legal equivalents, rather than by the examples given.

What is claimed:

1. A rechargeable electric battery, comprising: a plurality of metal-air cells, each including a metal anode, an air cathode, an anode electrolyte absorber adjacent said anode, a cathode electrolyte absorber adjacent said cathode, a separator separating said electrolyte absorbers, an input for supplying electrolyte to said absorbers at a supply side of said cell, an electrolyte reservoir positioned between said input and said cathode electrolyte absorber, and a drain for draining excess electrolyte from said electrolyte absorbers at a drain side of said cells; each of said metal-air cells being inclined so that said drain side is lower than said supply side.

2. The battery of claim 1, wherein said metal anode is made of zinc.

3. The battery of claim 1, further including a pump for pumping excess electrolyte drained from said drains of said cells and supplying it to said inputs of said cells.

4. The battery of claim 2, wherein said electrolyte includes potassium hydroxide.

5. The battery of claim 2, wherein said metal anode is a zinc paste.

6. The battery of claim 1, each metal-air cell further including an electrically conductive casing in contact with said anode and electrically insulated from said air cathode.

7. The battery of claim 6, further including an electrically nonconductive top having at least one opening permitting air to come into contact with said air cathode.

8. The battery of claim 1, wherein said plurality of metal-air cells are stacked at an incline of approximately 10° to horizontal.

9. The battery of claim 1, wherein said electrolyte absorbers are made of polymer fiber.

10. The battery of claim 1, wherein said air cathode includes an air permeable carbon membrane.

11. The battery of claim 1, wherein said separator includes a material which is impermeable to metal ions.

12. A rechargeable electrolyte starved zinc-air cell, comprising a zinc anode, an air cathode, an anode electrolyte absorber adjacent said anode, a cathode electrolyte absorber adjacent said cathode, a separator separating said electrolyte absorbers, an input for supplying electrolyte to said absorbers at a supply side of said cell, an electrolyte reservoir positioned between said input and said cathode electrolyte absorber, and a drain for draining excess electrolyte from said electrolyte absorbers at a drain side of said cell, said supply side of said cell being elevated relative to said drain side.

13. The zinc-air cell of claim 12, wherein said zinc anode includes a zinc paste.

14. The zinc-air cell of claim 12, wherein said electrolyte absorber is in the form of a mat.

15. The zinc-air cell of claim 12, wherein said electrolyte absorber is in the form of hydrogel.

16. The zinc-air cell of claim 12, wherein said electrolyte absorber is made of an inert plastic with a hydrophilic coating.

17. The zinc-air cell of claim 12, wherein said electrolyte supplied to said zinc-air cells is a simple or mixed aqueous base.

18. The zinc-air cell of claim 17, wherein said electrolyte is potassium hydroxide.

19. The zinc-air cell of claim 12, further including an electrically-conductive base in contact with said metal anode and electrically insulated from said air cathode.

20. The zinc-air cell of claim 12, further including an electrically-nonconductive top, having a least one opening to permit air to pass over said air cathode.

21. A rechargeable zinc-air electric traction battery for a vehicle, comprising: a plurality of electrolyte starved zinc-air cells, each including a zinc anode, an air cathode, an anode electrolyte absorber adjacent said anode, a cathode electrolyte absorber adjacent said cathode, a separator separating said electrolyte absorbers, an input for supplying electrolyte to said absorbers at a supply side of said cell, and a drain for draining excess electrolyte from said electrolyte absorbers at a drain side of said cells; each of said zinc-air cells being inclined so that said drain side is lower than said supply side; an electrolyte pump which pumps electrolyte from said drain side of said cells to be supplied to the supply side of said cells; a dispenser which dispenses said excess electrolyte supplied by said pump to said zinc-air cells through said input of each of said zinc-air cells; and a pressure controller for maintaining a constant pressure under which electrolyte is pumped.

22. The battery of claim 21, wherein said electrolyte includes potassium hydroxide.

23. The battery of claim 21, wherein said plurality of zinc-air cells is stacked at an incline of approximately a 10° angle to horizontal.

24. The battery of claim 21, further comprising a tank in which excess electrolyte from the drain of said zinc-air cells is collected.

25. The battery of claim 24, wherein said excess electrolyte is replenished with diluted electrolyte in said tank.

26. The battery of claim 24, further comprising a filter which filters out solid carbonates from the excess electrolyte collected in said tank.

27. The battery of claim 21, wherein said pressure controller includes an accumulator tank and a pressure switch, such that when electrolyte is pumped to said accumulator tank and said accumulator tank reaches a certain pressure, said pressure switch shuts the pump off, and when the pressure drops to a certain pressure, said pressure switch turns the pump on.

* * * * *